(No Model.) 2 Sheets—Sheet 2.
R. H. AVERY, Dec'd.
F. R. AVERY, Administrator.
TONGUELESS CULTIVATOR.
No. 537,401. Patented Apr. 9, 1895.
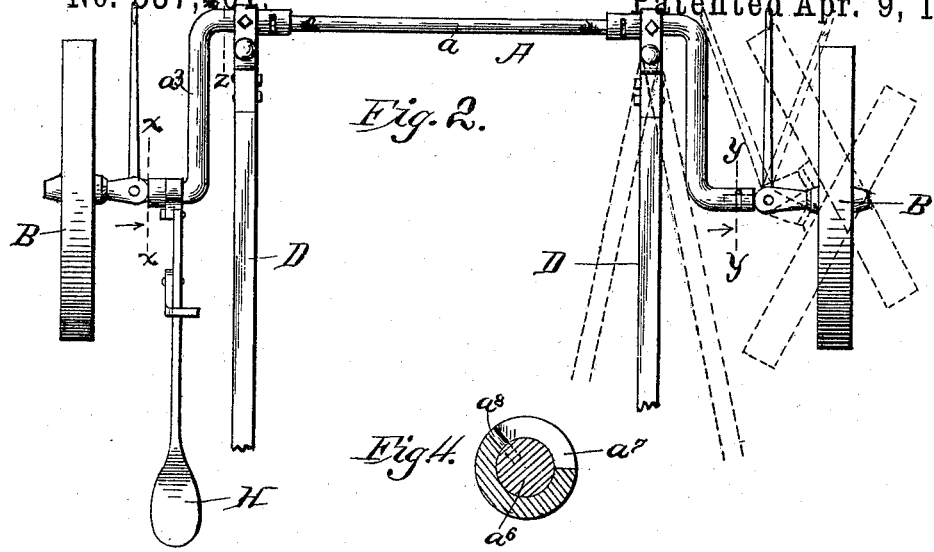
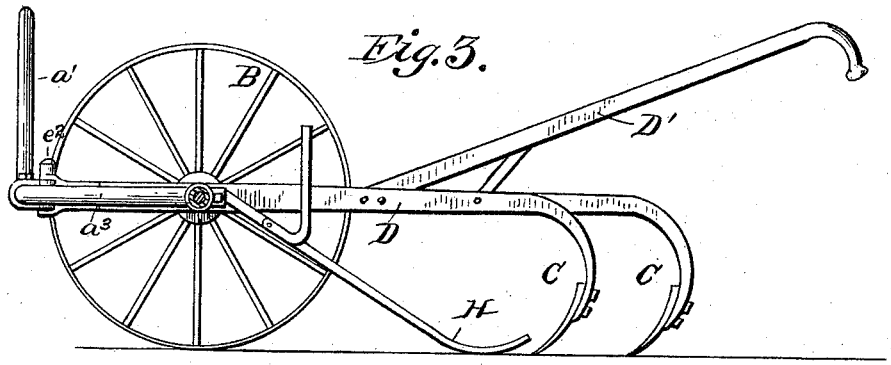
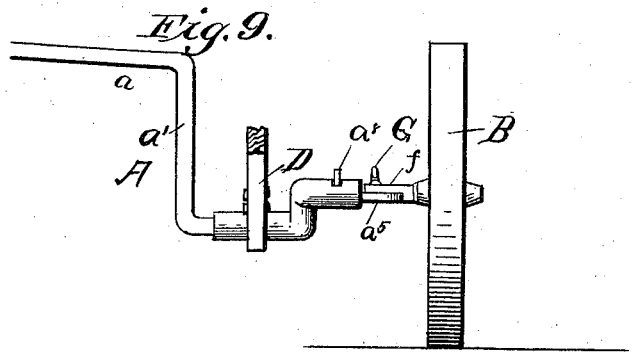

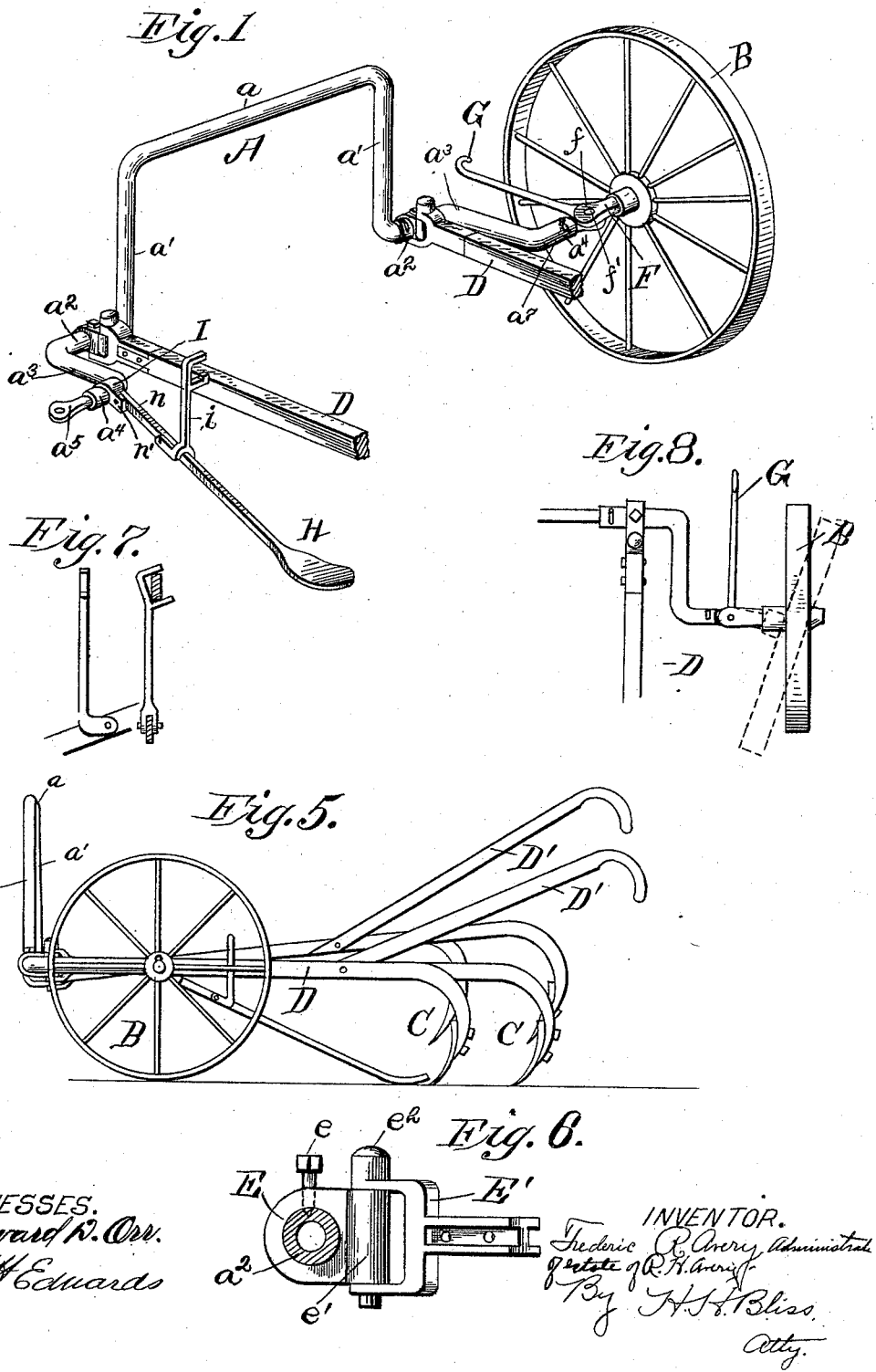

UNITED STATES PATENT OFFICE.

FREDERIC R. AVERY, OF PEORIA, ILLINOIS, ADMINISTRATOR OF ROBERT H. AVERY, DECEASED.

TONGUELESS CULTIVATOR.

SPECIFICATION forming part of Letters Patent No. 537,401, dated April 9, 1895.

Application filed December 14, 1894. Serial No. 531,778. (No model.)

*To all whom it may concern:*

Be it known that ROBERT H. AVERY, deceased, late a citizen of the United States, residing at Peoria, county of Peoria, State of Illinois, and of whose estate FREDERIC R. AVERY, of Peoria aforesaid, is now the administrator, has heretofore invented new and useful Improvements in Tongueless Cultivators, of which the following is a specification, reference being had to the accompanying drawings.

This invention relates to improvements in straddle row cultivators of the class generally designated as "tongueless" cultivators. The object is to provide a form of machine which can be handled more easily when in use in the field than can those of the earlier forms in this class, particularly with respect to the lifting of the shovels or plows. The parts which constitute the implement are so arranged that but slight effort is necessary to elevate the shovel beams either independently of each other or simultaneously.

It is now well known that tongueless cultivators can be so constructed as that the weight of the rear parts of the shovels and beams can be counterbalanced when both beams are lifted simultaneously, but it is by no means common to so construct such implements that there shall be such a counterbalancing effect when either beam is lifted independently of the other.

Figure 1 is a perspective of a sufficient portion of a tongueless cultivator to illustrate the manner of embodying the improvements. Fig. 2 is a plan view of a portion of the machine. Fig. 3 is a side view of the principal parts of the machine, the left hand wheel support being shown in section on the line $x$ $x$ of Fig. 2. Fig. 4 is a section on the line $y$ $y$ Fig. 2 through the right hand wheel support. Fig. 5 is a side view showing the positions of the parts assumed when the right hand beam is lifted independently of that on the left hand side. Fig. 6 is a section on the line $z$ $z$. Fig. 7 shows the beam support connected with the runner. Fig. 8 is a plan view of one of the wheels and the side part of the frame which supports it, and illustrating the capability of the wheel to follow the line of draft. Fig. 9 is a rear elevation of a portion of the machine.

A represents an arched bar, or row straddling connecting bar, which joins the two wheel supports, and the two parts which support the plow gangs. It has the top cross part $a$, the vertical legs, $a'$, the outwardly turned arms $a^2$, the backwardly turned arms $a^3$, and the outwardly extending wheel supporting parts $a^4$, the latter being situated at a suitable distance in the rear of the parts $a$, $a'$, $a^2$.

B B indicate the ground wheels which support the aforesaid parts and also the forward ends of the plow gangs.

The plows or shovels may be secured to any suitable frame or beam. As shown they are indicated by C and the respective sets are carried by the beams D D having at the rear the handles D'.

The beams are connected to the frame by couplings united to the outwardly extending arms $a^2$. These couplings also may, as concerns the details, be of any preferred form; but in order to advantageously attain the ends of the present invention, the three parts (the frame, the beam, and the coupling device, of whatsoever nature) should be so constructed and arranged that the beams can freely vibrate or oscillate laterally or horizontally independently of the frame but will be stopped from movement vertically with relation thereto—that is to say, the beam should have a hinge like support at the front end, but should be so attached that when it is lifted upward at the rear it causes the frame to descend correspondingly. One form of coupling device for accomplishing these ends is shown in the drawings. See Fig. 6. E is a sleeve fitted to the frame arm $a^2$ and adapted to be rigidly secured thereto by a set screw $e$, or otherwise, and having at $e'$ a tubular bearing. The beam carries the front yoke piece E', which is hinged to the tubular part $e'$ by a pivot bolt $e^2$. This coupling can be placed in any of several positions so as to adjust, as desired, the distance between the plow gangs.

It will be seen that the pivotal union at $e'$ $e^2$ allows the beam and plows to freely oscillate laterally or horizontally independently of the frame; and also that the devices which clamp the sleeve E to the part $a^2$ will resist any vertical motion of either the said part $a^2$ or the gang independently of each other.

Each wheel is mounted upon a spindle F which may be fitted in and secured to the wheel in any desired way. It extends to a suitable distance inside of the wheel and is preferably flattened to form, or provided with a plate $f$ for the purpose of receiving a pivot. The outwardly turned arm $a^4$ of the frame has an opposing pivot plate $a^5$. A bolt or a hinge pin $f'$ passes through the two parts $f$ and $a^5$, and when the wheel is thus joined to the frame it will be understood that it can vibrate or swing outward and inward more or less freely. By attaching it in this way all of the desirable features which are incident to a caster wheel are preserved, but the construction is simpler and more durable. Preferably the draft is applied directly to the wheel arm or spindle, for which purpose use may be made of any suitable device. As shown there is a forwardly projecting draft rod G formed with or secured to the wheel spindle F and having at the front end a hook or other device for hitching a horse. When the draft is thus applied the parts on each side of the machine are made more or less independent of each other, and either wheel and its plow gang can advance or be retarded without seriously affecting the action of the other.

The pivot plate $a^5$, above referred to, is not rigidly connected to the frame. As shown it is carried by a spindle $a^6$ which is inserted into a socket or chamber in the frame bar so that it can rock or oscillate relatively thereto. $a^8$ is a pin inserted in the spindle $a^6$ and lying in a slot $a^7$ in the frame bar, which slot is long enough to allow for all necessary motion.

It will be seen that the connection between the wheel and its supporting arm or bar is of the nature of a universal coupling—that is to say, it comprises two pivotal devices, one at $a^6$ and the other at $f'$, which are at an angle to each other and allow the wheel spindle to either rock on a horizontal axis or vibrate around a vertical axis. There are limits to the movements of the several parts of this universal joint for other purposes, but within those limits there is a practically universal adjustment as to the wheel spindle.

The movements of the several parts which are made possible by constructing and arranging them in the way above described will now be readily understood.

It will be noticed that the normal line of the wheel axes is considerably behind the vertical plane of the arch or row straddling connecting part; and also that there is considerable weight in front of the said line of the wheel axes. Hence, as that line lies in the vertical plane of the ground support all the said weight which is in front can be utilized to counterbalance the weight of that part of the beams and gangs which is behind said line. If, for instance, the operator desires to lift the right hand beam he can do so easily because the instant he exerts an upward pressure upon the handle B', the wheel frame lying in front of the wheel axis exerts its counterbalancing force and the forward right hand corner of the frame (that is, the part adjacent to the right hand arm $a^2$) tends to drop downward, swinging down around the line of the wheel axis. The slot $a^7$ in the right hand wheel arm $a^4$ permits this dropping of the front portion of the frame without interference from the draft devices, which may in the meantime be exerted on the rod G under the power of the horse. The draft devices are practically independent of the frame, as are also the supporting wheels. During such counterbalanced movements of the right hand beam and gangs, up or down, the left hand beam and gang are practically undisturbed, and the left hand shovels can continue at work. The slight tendency for the left hand beam to rock a little inward because of the dropping of the forward right hand corner of the frame is not sufficient to interfere with the proper operation of said shovels on the left; and, vice versa, the left hand beam and shovels can be similarly under counterbalance independently of those on the right hand, the latter remaining at work. Again, it will be seen that both of the beams and gangs can be simultaneously lifted under counterbalance, for when so lifted all of that part of the frame which lies in front of the wheel axis will drop in parallelism overcoming more or less of the weight of the rear part of the gangs.

When going to and from the field, or the place of working, the beams may be elevated and supported on suitable runners of any form. As shown, there is on each side a runner H whose arm $h$ is pivoted at $h'$ to one of the transversely situated parts of the frame, preferably to the wheel arm $a^4$. To the runner there is pivoted a rest I having a supporting bar $i$, in which rest the beam can be placed when not in use.

What is claimed is—

1. In a tongueless cultivator, a row straddling frame, having on each side a backwardly extending wheel supporting part, laterally vibratable wheels pivotally connected to the backwardly extended parts, the wheel spindles, the draft devices connected with said wheel spindles, and the two independently counterbalanced shovel gangs secured to the frame in front of the wheel axis, substantially as set forth.

2. In a tongueless cultivator, the combination of the arched bar having at each side a backwardly extending wheel support rigid with said bar, the laterally vibrating wheels, the wheel spindles pivotally connected to the rearwardly extending wheel supports, the vertically oscillating joining device between each wheel spindle and the backwardly extending wheel support, and the plow beams coupled to the frame in front of the axis of the wheels, substantially as set forth.

3. The combination of the arch bar having arms or bars $a^3$ extending backward therefrom, the wheels having their axes behind the arch and connected to the bars $a^3$ by universal joints, and the plow beams connected to the arch by couplings in or adjacent to the vertical plane thereof, substantially as set forth.

4. The combination of the arch, the bars extending backwardly therefrom, the wheels having spindles connected to the said backward extending bars by universal joints, the draft devices connected to the wheel spindles, and the plow beams connected to the arch frame in front of the wheel spindles, substantially as set forth.

5. The combination with the arch having the backwardly extending bars, of the wheels having spindles which can vibrate both horizontally and vertically relatively to the backwardly extending bars, and the plow beams pivotally connected to the arch frame in front of the wheel spindles, substantially as set forth.

6. The combination with the arch and the bars extending backwardly therefrom, of the wheels, the connecting device for each wheel formed in two parts, the vertical pivot which joins the said two parts, the horizontal pivot which joins one of said parts to the backwardly extending parts of the arch frame, and the plow gangs hinged to said arch frame, substantially as set forth.

7. The combination with the arch or connecting bar having wheel carrying bars extending backwardly therefrom, and vertically vibratable relatively to the arch of the wheel on each side having a horizontally vibratable spindle, the draft devices connected to the said spindle and extending to or in front of the wheel, and the plow gangs connected by vertical pivots to the arch or connecting bar in front of the wheel axis, substantially as set forth.

8. The combination with the frame having the arch or connecting bar $a$, the gang supporting bar $a^2$, and the rearward extending bars $a^3$ all rigid with each other, of the wheels, each having a spindle F, the draft devices G connected to said spindles, the bars $a^5$ pivotally connected to the spindles and to the bars $a^3$, and the plow beams coupled to the bars $a^2$, substantially as set forth.

9. In a cultivator, the arch or connecting bar having the part $a$, the bars $a^2$, and the bars $a^3$, all rigid with each other, in combination with the plow gangs pivoted thereto, and the horizontal vibratable wheels pivotally connected to the rear ends of the bars $a^3$, and the draft rods arranged to apply power directly to the wheels, substantially as set forth.

In testimony whereof I affix my signature in the presence of two witnesses.

FREDERIC R. AVERY,
*Administrator.*

Witnesses:
G. F. CARSON,
HARRY N. BLACKMON.